US008706988B2

(12) United States Patent
Yonezawa et al.

(10) Patent No.: US 8,706,988 B2
(45) Date of Patent: Apr. 22, 2014

(54) MEMORY SYSTEM

(75) Inventors: Shinji Yonezawa, Kanagawa-ken (JP); Hajime Yamazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 12/646,100

(22) Filed: Dec. 23, 2009

(65) Prior Publication Data

US 2010/0169597 A1 Jul. 1, 2010

(30) Foreign Application Priority Data

Dec. 24, 2008 (JP) ................................. 2008-327992

(51) Int. Cl.
G06F 12/16 (2006.01)
G06F 11/14 (2006.01)
G06F 12/02 (2006.01)

(52) U.S. Cl.
CPC ........ G06F 11/1471 (2013.01); G06F 12/0246 (2013.01)
USPC ............ 711/162; 711/161; 711/154; 711/170

(58) Field of Classification Search
CPC .......................... G06F 11/1471; G06F 12/0246
USPC ......... 711/161, 162, 175, 203, 154, 112, 113, 711/E12.002, E12.1, E12.8, 170, 171, 17, 711/E12.82
See application file for complete search history.

(56) References Cited

U.S. PATENT DOCUMENTS 7,882,316 B2 * 2/2011 Boyd et al. .................... 711/162
8,225,058 B2 * 7/2012 Miyamoto et al. ............ 711/162

(Continued)

FOREIGN PATENT DOCUMENTS

JP 10-240629 A 9/1998
JP 2001-249852 A 9/2001

(Continued)

OTHER PUBLICATIONS

U.S. Appl. No. 12/530,467, filed Sep. 9, 2009, Junji Yano, et al.

(Continued)

Primary Examiner — Pierre-Michel Bataille
(74) Attorney, Agent, or Firm — Oblon, Spivak, McClelland, Maier & Neustadt, L.L.P.

(57) ABSTRACT

A memory system comprising a volatile memory unit, a nonvolatile memory unit, and a controller that performs data transfer between a host system and the nonvolatile memory unit via the volatile memory unit stores management information including a storage position of the data stored in the nonvolatile memory unit during a startup operation into the volatile memory unit, and performs, while updating stored management information, data management in the volatile and nonvolatile memory units based on the stored management information. The nonvolatile memory unit includes a snapshot storing area storing a snapshot which is the management information stored in the volatile memory unit at a certain point, a main log storing area storing a main log which is an update information of the management information stored in the volatile memory unit, and a backup log storing area storing a backup log having contents same as contents of the main log. The controller stores the management information of the volatile memory unit in the snapshot storing area as a snapshot when a predetermined condition is satisfied, and sequentially stores the main log in the main log storing area when the management information is changed and the backup log in the backup log storing area.

16 Claims, 17 Drawing Sheets

(56) References Cited

U.S. PATENT DOCUMENTS

| | | | |
|---|---|---|---|
| 8,285,954 B2 * | 10/2012 | Yano et al. .................. | 711/162 |
| 8,443,133 B2 * | 5/2013 | Yano et al. .................. | 711/162 |
| 2005/0097288 A1 * | 5/2005 | Holzmann .................. | 711/162 |
| 2006/0224636 A1 | 10/2006 | Kathuria et al. | |
| 2010/0169551 A1 * | 7/2010 | Yano et al. .................. | 711/170 |
| 2010/0205353 A1 * | 8/2010 | Miyamoto et al. ............ | 711/162 |

FOREIGN PATENT DOCUMENTS

| | | |
|---|---|---|
| JP | 2002-41369 A | 2/2002 |
| JP | 2005-242897 A | 9/2005 |
| JP | 2006-127287 A | 5/2006 |
| JP | 2006-338610 A | 12/2006 |

OTHER PUBLICATIONS

U.S. Appl. No. 12/884,844, filed Sep. 17, 2010, Yano, et al.
U.S. Appl. No. 13/328,420, filed Dec. 16, 2011, Yonezawa, et al.
U.S. Appl. No. 13/326,872, filed Dec. 15, 2011, Hirao et al.
U.S. Appl. No. 13/238,675, filed Sep. 21, 2011, Norimatsu, et al.
U.S. Appl. No. 13/599,087, filed Aug. 30, 2012, Yonezawa, et al.
Office Action issued Feb. 12, 2013, in Japanese Patent Application No. 2008-327992 (submitting English translation only).

* cited by examiner

FIG.7

|  | INTRA-NAND LOGICAL ADDRESS | INTRA-NAND PHYSICAL ADDRESS |
|---|---|---|
| BLOCK 1 | | |
| BLOCK 2 | | |
| BLOCK 3 | | |
| ⋮ | | |

43

FIG.17A
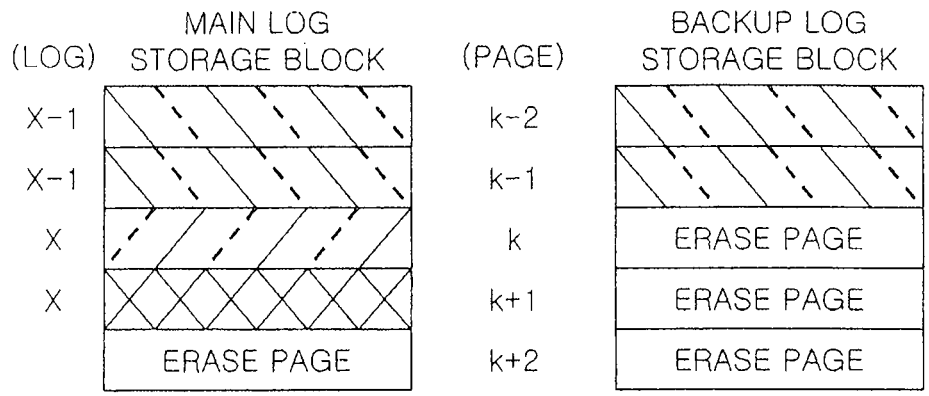
FIG.17B
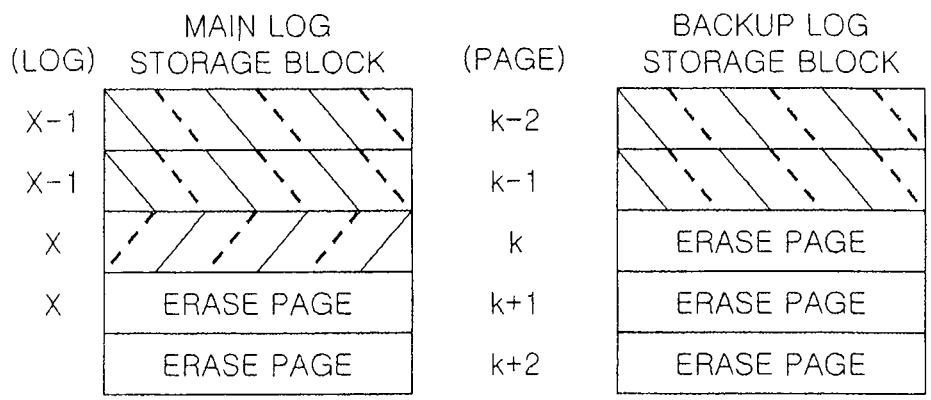
 : LOG THAT RECORD OF PROCESS (X-1) SUCCEEDED
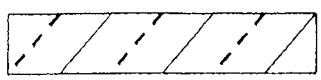 : LOG THAT RECORD OF PROCESS (X) SUCCEEDED
 : DESTROYED LOG OF PROCESS (X)

FIG.17C
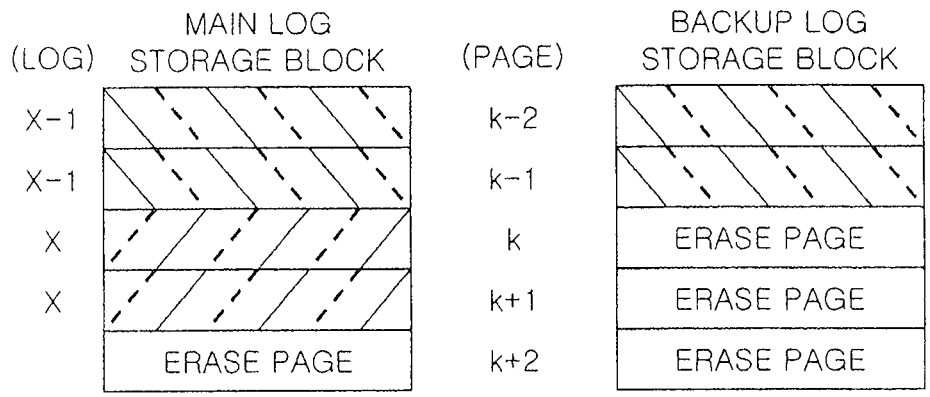
FIG.17D
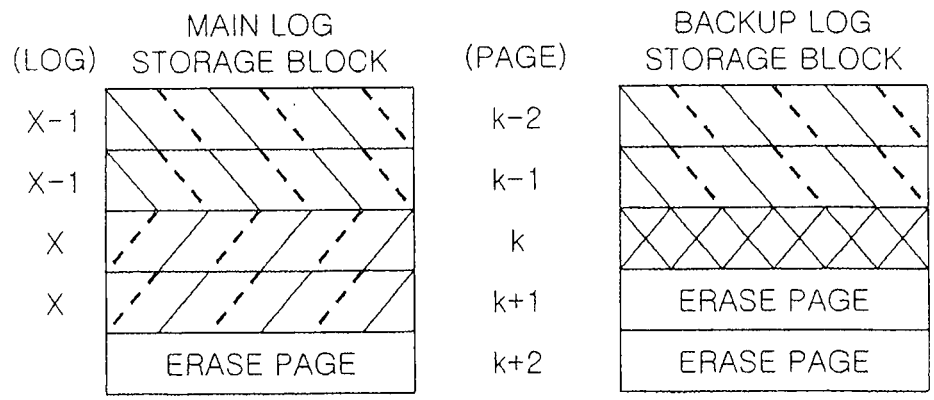
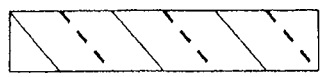 : LOG THAT RECORD OF PROCESS (X-1) SUCCEEDED
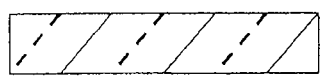 : LOG THAT RECORD OF PROCESS (X) SUCCEEDED
 : DESTROYED LOG OF PROCESS (X)

FIG.17E
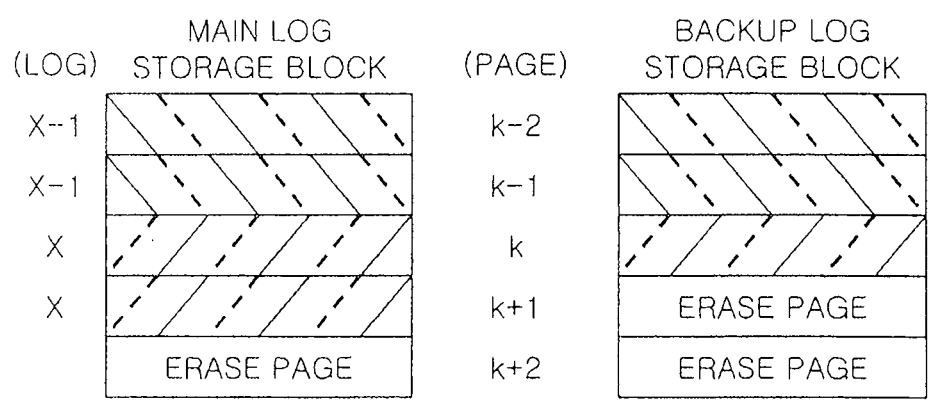
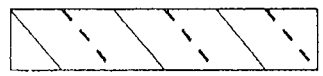 : LOG THAT RECORD OF PROCESS (X-1) SUCCEEDED
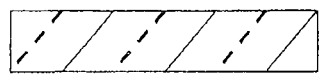 : LOG THAT RECORD OF PROCESS (X) SUCCEEDED

MEMORY SYSTEM

CROSS-REFERENCE TO RELATED APPLICATIONS

This application is based on and claims the benefit of priority from the prior Japanese Patent Application No. 2008-327992, filed on Dec. 24, 2008, the entire contents of which are incorporated herein by reference.

BACKGROUND

1. Field

The present invention relates to a memory system employing a nonvolatile semiconductor storage device.

2. Related Art

Some personal computers (PC) employ a hard disk device as a secondary storage device. In such PCs, a technology is known for backing up data that has been stored in the hard disk device to prevent the data from becoming invalid because of some failure. For example, when act of changing data in the hard disk device is detected, a snapshot as a backup copy of the data before the change is taken and a log of changes made to the data is generated. Then, process for taking a new snapshot, invalidating a log taken in the past before the new snapshot was taken, and generating a new log is repeated at every predetermined time (see, for example, US Patent Application Publication No. 2006/0224636). In case data becomes invalid due to some reason, the data can be restored by referring to the snapshot and the log. There are typically two types of logs: main log and backup log. The main log is a log that is generated, before update of data, as an update plan indicating how the data is going to be updated. On the other hand, the main log is a log for approving, after the data is actually updated, updating of the data.

In recent years, a capacity of a NAND flash memory as a nonvolatile semiconductor storage device has been increased dramatically. As a result, PCs including a memory system having the NAND flash memory as a secondary storage device have been put to practical use. For example, in the NAND flash memory, data writing and readout are performed in page size units and data erasing is performed in block size units. Therefore, in the NAND flash memory, the main log and the backup log are written in various pages of various blocks, respectively. A technique for storing a plurality of data (multi level data) equal to or larger than 2 bits in one memory cell (a multi level memory technology) is sometimes employed to the NAND flash memory (see, for example, JP-A 2004-192789 (KOKAI)). Therefore, in PCs that incorporate a NAND flash memory, process for resetting the PC from abnormal isolation or the like of a power supply is difficult or data cannot be restored.

SUMMARY

According to one aspect of the present invention, there is provided a memory system comprising a volatile memory unit, a nonvolatile memory unit, and a controller that performs data transfer between a host system and the nonvolatile memory unit via the volatile memory unit, stores management information including a storage position of the data stored in the nonvolatile memory unit during a startup operation into the volatile memory unit, and performs, while updating stored management information, data management in the volatile and nonvolatile memory units based on the stored management information, wherein the nonvolatile memory unit includes a snapshot storing area storing a snapshot which is the management information stored in the volatile memory unit at a certain point, a main log storing area storing a main log which is an update information of the management information stored in the volatile memory unit, and a backup log storing area storing a backup log having contents same as contents of the main log, and the controller stores the management information of the volatile memory unit in the snapshot storing area as a snapshot when a predetermined condition is satisfied, and sequentially stores the main log in the main log storing area when the management information is changed and the backup log in the backup log storing area.

BRIEF DESCRIPTION OF THE DRAWINGS

FIG. 7 illustrates an example of an intra-NAND logical-physical conversion information table;

FIG. 17 is diagram for explaining state of logs when the abnormal power shutdowns occur as shown in FIG. 16.

DETAILED DESCRIPTION

One embodiment of memory systems according to the present invention are explained in detail below with reference to the accompanying drawings. The present invention is not limited by these embodiments.

A memory system according to an embodiment of the present invention is a system that stores data using a NAND memory. Moreover, this memory system stores logs after the data writing (data storage) process as logs for the data writing process (difference information for management information of the memory system). When an abnormal shutdown (e.g., a momentary interruption) of a power supply or the like occurs, the management information is restored to a state before the abnormal power shutdown by using the log. In the embodiment, the abnormal power shutdown is assumed to be a momentary power interruption.

Figure 1:
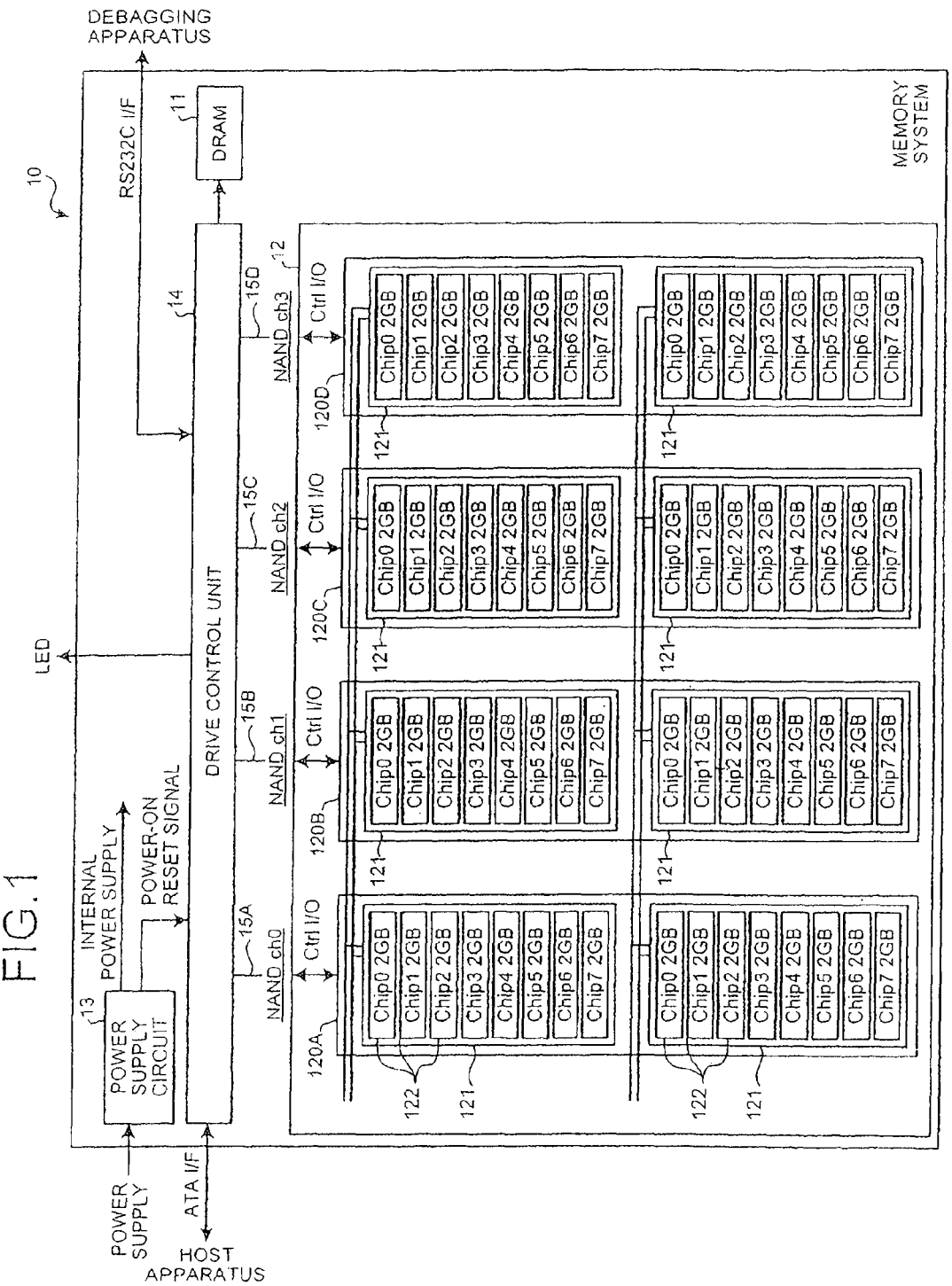
FIG. 1 is a block diagram of an example of a configuration of a memory system according to an embodiment of the present invention.

An overview of the memory system according to the embodiment is given first. Thereafter, characteristics and modifications of the memory system are explained. The memory system includes a nonvolatile semiconductor storage device and is used as a secondary storage device (SSD: Solid State Drive) of a host system such as a personal computer. The memory system has a function of storing data requested by a host system to be written and reading out data requested by the host system to be read out and outputting the data to the host system. FIG. 1 is a block diagram of an example of a configuration of a memory system 10 according to the embodiment. This memory system 10 includes a DRAM (Dynamic Random Access Memory) 11 as a first storing unit, a NAND flash memory (hereinafter, "NAND memory") 12 as a second storing unit, a power supply circuit 13, and a drive control unit 14 as a controller.

The DRAM 11 is used as a storing unit for data transfer, management information recording, or a work area. Specifically, when the DRAM 11 is used as a storing unit for data transfer, the DRAM 11 is used for temporarily storing data requested by the host system to be written before the data is written in the NAND memory 12, and the DRAM 11 is used to readout data requested by the host system to be read out from the NAND memory 12 and temporarily storing the read data. When the DRAM 11 is used as a storing unit for management information recording, the DRAM 11 is used for storing management information for managing storage positions of data stored in the DRAM 11 and the NAND memory 12. When the DRAM 11 is used as a storing unit for a work area, the DRAM 11 is used, for example, during a development of logs used when management information is restored.

The NAND memory 12 is used as a storing unit for storing therein data. Specifically, the NAND memory 12 stores therein data designated by the host system and stores therein, for backup, management information managed by the DRAM 11. In FIG. 1, the NAND memory 12 that includes four channels 120A to 120D has been shown as an example. Each of the channels 120A to 120D includes two packages 121 each including eight chips 122 having a storage capacity of a predetermined size (e.g., 2 GB). The channels 120A to 120D are connected via the drive control unit 14 and buses 15A to 15D.

The power supply circuit 13 receives external power supply and generates a plurality of internal power supplies to be supplied to respective units of the memory system 10 from the external power supply. The power supply circuit 13 detects a state of the external power supply, i.e., a rising edge or a falling edge, and generates a power on reset signal based on the detected state, and outputs the power on reset signal to the drive control unit 14.

The drive control unit 14 controls the DRAM 11 and the NAND memory 12. As explained in detail later, for example, the drive control unit 14 performs restoring process for management information and storage process for management information according to the power on reset signal from the power supply circuit 13. The drive control unit 14 transmits and receives data to and from a host system via an ATA interface (I/F) and transmits and receives data to and from a debugging apparatus via an RS232C I/F. Furthermore, the drive control unit 14 outputs a control signal for controlling on/off of an LED for state display provided on the outside of the memory system 10.

Figure 2:
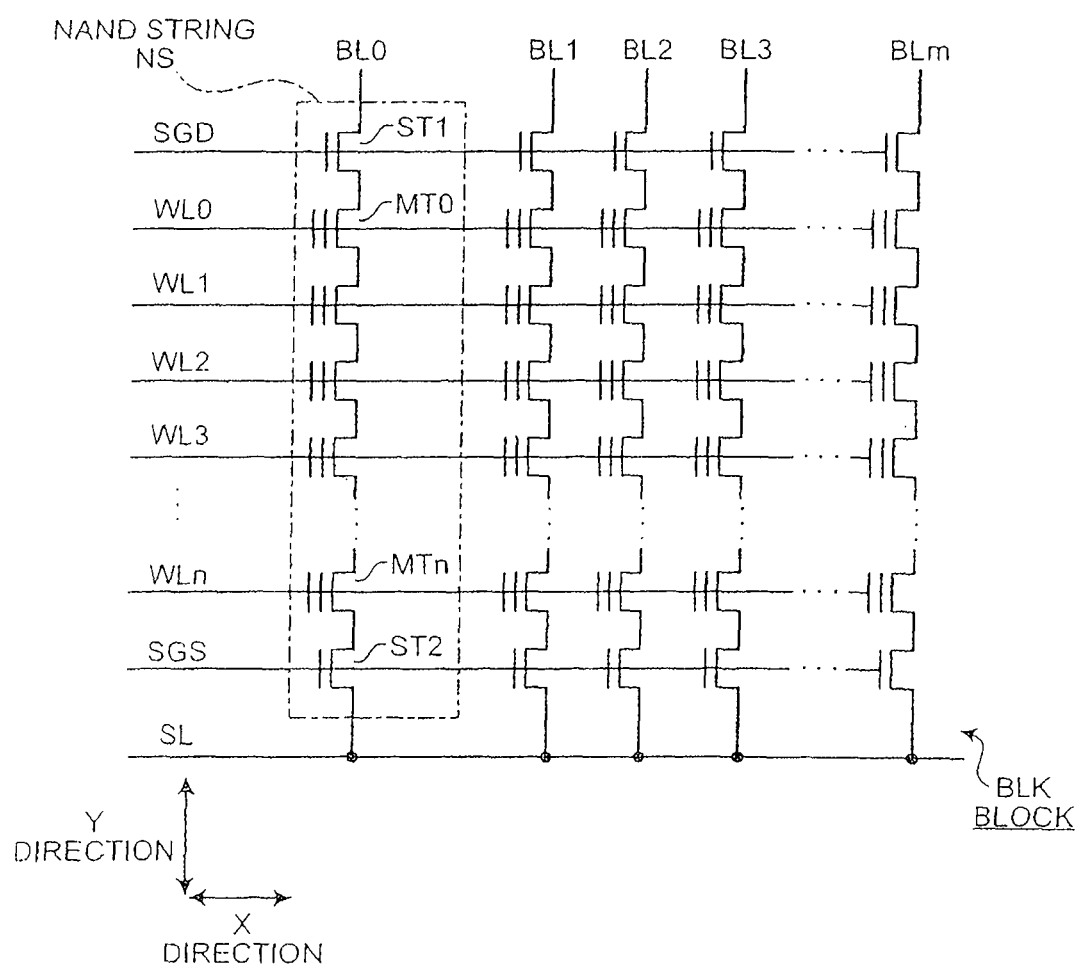
FIG. 2 is a circuit diagram of an example of a configuration of an arbitrary block of a NAND memory.

A configuration of the NAND memory 12 is explained in detail below. The NAND memory 12 is configured by arraying a plurality of blocks (erasing unit areas), which are units of data erasing, on a substrate. FIG. 2 is a circuit diagram of an example of a configuration of an arbitrary block of the NAND memory 12. In FIG. 2, left-right direction is set as an X direction and a direction perpendicular to the X direction is set as a Y direction.

Each block BLK of the NAND memory 12 includes (m+1) (m is an integer equal to or larger than 0) NAND strings NS arrayed in order along the X direction. Each NAND string NS has (n+1) (n is an integer equal to or larger than 0) memory cell transistors MT0 to MTn that share a diffusion region (a source region or a drain region) between memory cell transistors MT adjacent to each other in the Y direction. Moreover, the memory cell transistors MT0 to MTn are connected in series in the Y direction. In addition, selection transistors ST1 and ST2 arranged at both ends of a row of the (n+1) memory transistors MT0 to MTn.

Each memory cell transistors MT0 to MTn is a MOSFET (Metal Oxide Semiconductor Field Effect Transistor) having a stacked gate structure formed on a semiconductor substrate. The stacked gate structure includes a charge accumulation layer (a floating gate electrode) formed on the semiconductor substrate via a gate insulating film and a control gate electrode formed on the charge accumulating layer via an inter-gate insulating film. Moreover, the memory cell transistors MT0 to MTn are multi level memories in which a threshold voltage changes according to the number of electrons accumulated in the floating gate electrode and 2 or more bit data can be stored depending on the difference in the threshold voltage.

Although the memory cell transistors MT0 to MTn are explained to be multi level memories, the memory cell transistors MT0 to MTn can be single level memories that store 1 bit data. It is assumed in following explanation that memory cell transistors MT0 to MTn are multi level memories that can store quaternary levels. However, the memory cell transistors MT0 to MTn can be multi level memories that can store values larger than the quaternary values.

Word lines WL0 to WLn are respectively connected to the control gate electrodes of the memory cell transistors MT0 to MTn of each NAND string NS. Memory cell transistors MTi (i=0 to n) in each of the NAND strings NS are connected in common by the same word lines (i=0 to n). In other words, the control gate electrodes of the memory cell transistors MTi present on the same row in the block BLK are connected to the same word line WLi. (m+1) memory cell transistors MTi connected to the same word line WLi are treated as one page. In the NAND memory 12, writing and readout of data are performed in units of a page. Specifically, a group of the (m±1) memory cell transistors MTi connected to the same word line WLi is a unit that forms one page. In the case of the multi level memory that can store quaternary values, a group of the memory cell transistors MTi connected to the same word line WLi forms two pages. When a page in which data is written first is set as a lower order page and a page in which data is written next is set as a higher order page, in the NAND memory 12, writing and readout of data is performed in units of the pages.

Bit lines BL0 to BLm are respectively connected to drains of the (m+1) selection transistors ST1 in one block BLK. A selection gate line SGD is connected in common to gates of the selection transistors ST1 of each NAND string NS. Sources of the selection transistors ST1 are connected to drains of the memory cell transistors MT0. Similarly, a source line SL is connected in common to sources of the (m+1) selection transistors ST2 in one block BLK. A selection gate line SGS is connected in common to gates of the selection transistors ST2 of each NAND string NS. Drains of the selection transistors ST2 are connected to sources of the memory cell transistors MTn.

Although not shown in the figure, bit lines BLj (j=0 to m) in one block BLK connect drains of the selection transistors ST1 in common between bit lines BLj of other blocks BLK. In other words, the NAND strings NS in the same column in the blocks BLK are connected by the same bit line BLj.

Figure 3A:
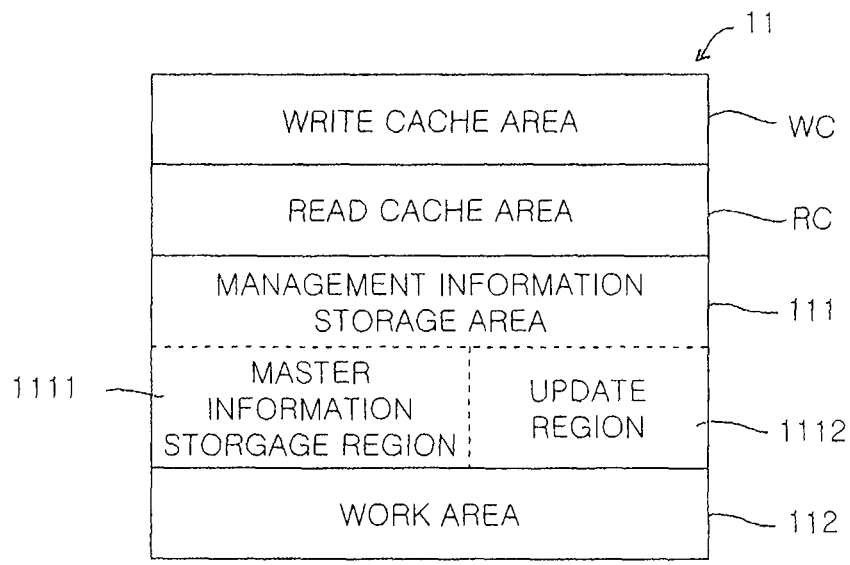
FIG. 3A is a schematic diagram of a functional configuration of a DRAM and FIG. 3B is a schematic diagram of a functional configuration of the NAND memory.

Functional configurations of the DRAM 11 and the NAND memory 12 are explained next. FIG. 3A is a schematic diagram of a functional configuration of the DRAM 11 and FIG. 3B is a schematic diagram of a functional configuration of the NAND memory 12.

As shown in FIG. 3A, the DRAM 11 includes a write cache area WC in which data requested by the host system to be written is stored, a read cache area RC in which data requested by the host system to be read out is stored, a management information storage area 111 in which management information for managing storage positions of data stored in the DRAM 11 and the NAND memory 12 is stored, and a work area 112 used when the management information is restored. The management information storage area 111 includes a master information storage region 1111 and an update region 1112. The master information storage region 1111 stores a master information for managing the storage positions of data of the management information with table. The update region 1112 temporarily stores update information which indicates an update portion to the master information when the master information is updated.

Figure 3B:
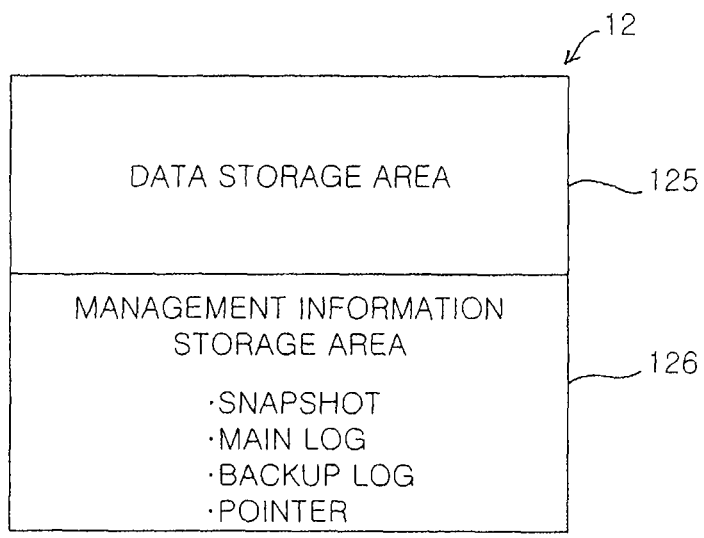

As shown in FIG. 3B, the NAND memory 12 includes a data storage area 125 in which data requested by the host system to be written as stored and a management information storage area 126 in which the management information managed in the management information storage area 111 of the DRAM 11 is stored. The management information storage area 126 stores a management information storage information which includes a snapshot, a main log as a first log, a backup log as a second log and a pointer 230. The snapshot is a copy of the master information at a predetermined point. The main and backup logs are difference information from the master information. The pointer indicates a storage position of the snapshot. In this example, a data writing and readout unit in the NAND memory 12 is set as a page size unit. An erasing unit is set as a block size unit (e.g., 512 KB). Therefore, an area for storing respective blocks of the NAND memory 12 managed in block size units is further divided into areas of page size units.

Figure 4:
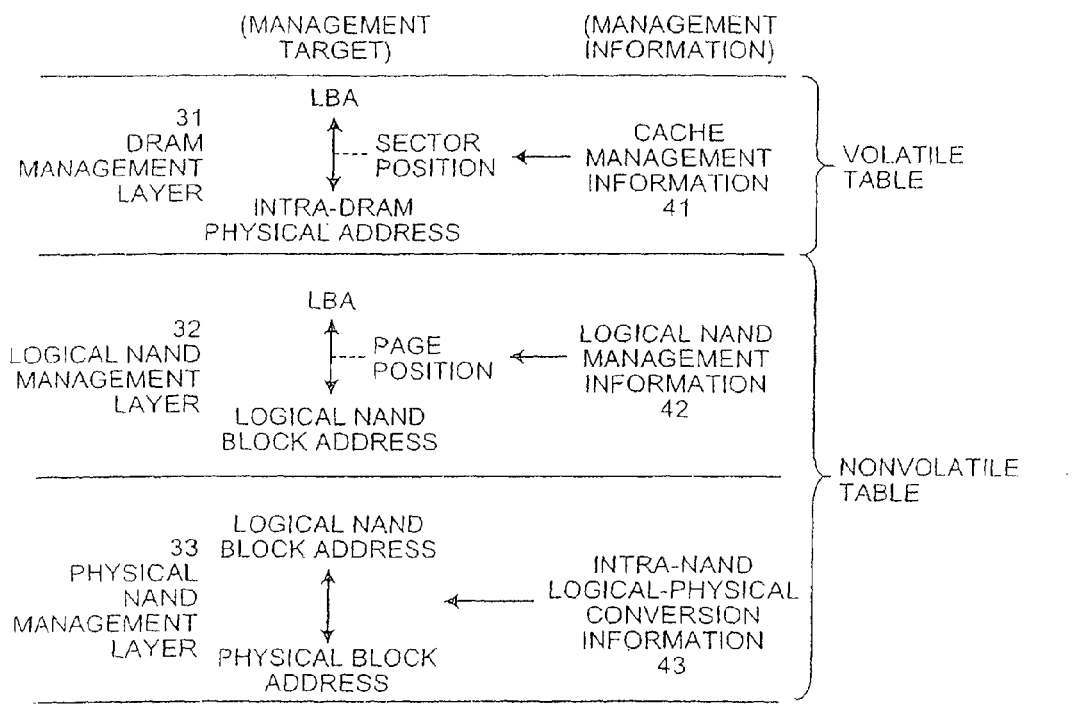
FIG. 4 is a diagram of an example of a layer structure for managing data stored in the memory system.

The management information managed in the management information storage area 111 of the DRAM 11 is explained below. FIG. 4 is a diagram of an example of a layer structure for managing data stored in the memory system 10. It is assumed here that this data is the data requested by the host system to be written or read out. In the memory system 10, data management is performed by a three layer structure: a DRAM management layer 31, a logical NAND management layer 32, and a physical NAND management layer 33. The DRAM management layer 31 performs data management in the DRAM 11 that plays a role of a cache. The logical NAND management layer 32 performs logical data management in the NAND memory 12. The physical NAND management layer 33 performs physical data management in the NAND memory 12, life extension process for the NAND memory 12, and the like.

In the write cache area WC and the read cache area RC of the DRAM 11, data designated by a logical address (hereinafter, "LBA (Logical Block Address)") managed by an address managing method of the host system is stored in a physical address in a predetermined range on the DRAM 11 (hereinafter, "intra-DRAM physical address). Data in the DRAM management layer 31 is managed by cache management information 41 including a correspondence relation between an LBA of data to be stored and the intra-DRAM physical address and a sector flag indicating presence or absence of data in sector size units in a page.

Figure 5:
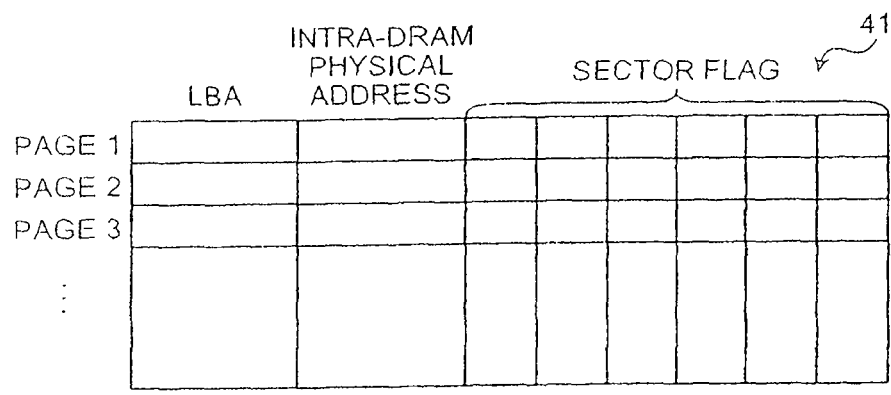
FIG. 5 illustrates an example of a cache management information table.

FIG. 5 illustrates an example of the cache management information 41 in tabular manner. The cache management information 41 is one entry for one area of a one page size of the DRAM 11. The number of entries is equal to or smaller than the number of pages that fit in the write cache area WC and the read cache area RC. In each of the entries, the LBA of data of a page size, the intra-DRAM physical address, and a sector flag indicating a position of valid data in each of areas obtained by dividing this page by a sector size are associated.

In the NAND memory 12, data from the DRAM 11 is stored in a physical address in a predetermined range (hereinafter, "intra-NAND physical address) on the NAND memory 12. In the NAND memory 12 formed by the multi level memory, because the number of rewritable times is limited, the numbers of times of rewriting among the blocks configuring the NAND memory 12 are controlled by the drive control unit 14 to be equalized. In other words, when update of data written in a certain intra-NAND physical address in the NAND memory 12 is performed, the drive control unit 14 performs control to equalize the numbers of times of rewriting among the blocks configuring the NAND memory 12 to write, in a block different from the original block, data reflecting a portion required to be updated of a block in which the data to be updated is included and invalidate the original block.

As explained above, in the NAND memory 12, process units are different in the writing and readout process for data and the erasing process for data. In the update process for data, a position (a block) of data before update and a position (a block) of data after update are different. Therefore, in the embodiment, an intra-NAND logical address used independently in the NAND memory 12 (hereinafter, "intra-NAND logical address") is provided besides the intra-NAND physical address.

Therefore, data in the logical NAND management layer 32 is managed by logical NAND management information 42 indicating a relation between an LBA of data in page size units received from the DRAM 11 and an intra-NAND logical address indicating a logical page position of the NAND memory 12 in which the received data is stored and a relation indicating an address range of a logical block having a size coinciding with that of a block as an erasing unit in the NAND memory 12. A collection of a plurality of the logical blocks can be set as a logical block. Data in the physical NAND management layer 33 is managed by intra-NAND logical address-physical address conversion information (hereinafter, "logical-physical conversion information) including a correspondence relation between the intra-NAND logical address and the intra-NAND physical address in the NAND memory 12.

Figure 6:
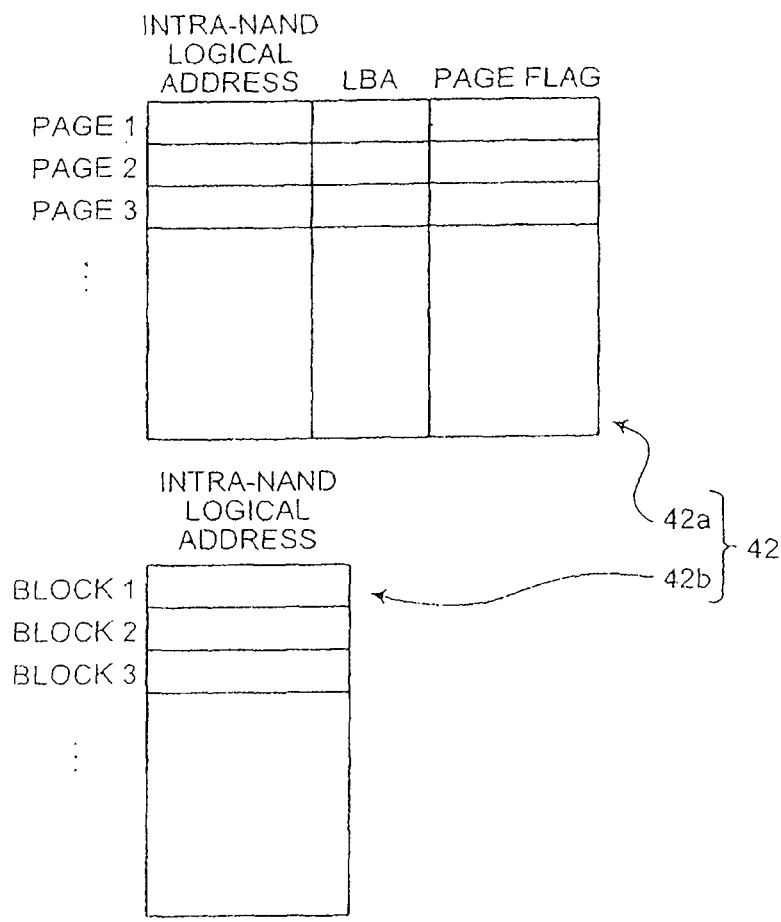
FIG. 6 illustrates an example of a logical NAND management information table.

FIG. 6 illustrates an example of the logical NAND management information 42 in tabular manner. FIG. 7 illustrates an example of intra-NAND logical-physical conversion information 43 in tabular manner. As shown in FIG. 6, the logical NAND management information 42 includes logical page management information 42a and logical block management information 42b. The logical page management information 42a has one entry for one logical area of a one page size. Each of entries includes an LBA of data of the one page size, an intra-NAND logical address (a logical NAND block address), and a page flag indicating whether this page is valid. The logical block management information 42b includes an intra-NAND physical address (a physical block address) set for a physical area of the one block size of the NAND memory 12. As shown in FIG. 7, in the intra-NAND logical-physical conversion information 43, the intra-NAND physical address and the inter-NAND logical address of the NAND memory 12 are associated.

By using these kinds of management information (master information), a correspondence of the LBA used in the host system, the intra-NAND logical address used in the NAND memory 12, and the intra-NAND physical address used in the NAND memory 12 can be established. This makes it is possible to exchange data between the host system and the memory system 10.

The management information managed by the DRAM management layer 31 is lost because of power off or the like so that this management information can be called a volatile table. On the contrary, if the management information managed by the logical NAND management layer 32 and the physical NAND management layer 33 is lost because of power off or the like, the lost management information hinders successful startup of the memory system 10 so that measures are required to be taken such that the management information is stored even in the event of power off or the like. Therefore, this management information can be called a nonvolatile table.

This nonvolatile table manages data stored in the NAND memory 12. If the nonvolatile table is not present, information stored in the NAND memory 12 cannot be accessed or data stored in an area is erased. Therefore, the nonvolatile table needs to be stored as latest information in preparation for sudden power off. Therefore, in the embodiment, master information (management information) including at least the nonvolatile table is stored in the latest state in the management information storage area 126 of the NAND memory 12. The management information storage information stored in the management information storage area 126 of the NAND memory 12 is explained below. The following explanation assumes that only the nonvolatile table is stored in the management information storage area 126.

Figure 8:
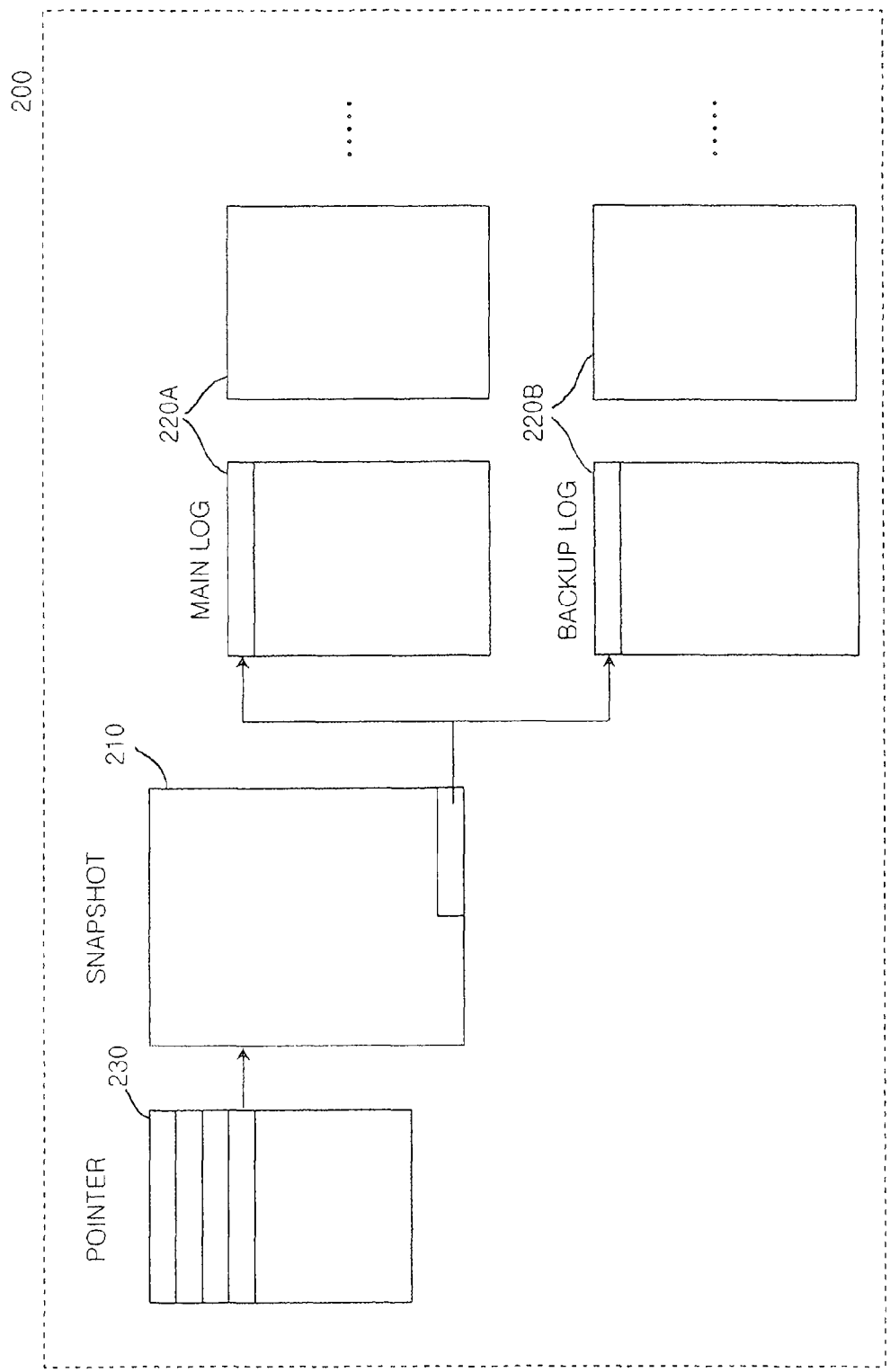
FIG. 8 is a schematic diagram of an example of contents of management information storage information stored in a management information storage area according to the embodiment.

FIG. 8 is a schematic diagram of an example of contents of the management information storage information 200 stored in the management information storage area 126. The management information storage information 200 contains a snapshot 210 as contents of the nonvolatile table at a certain point, a main log 220A, a backup log 220B, and a pointer (management information storage position indication information) 230.

The snapshot 210 is information obtained by storing management information including at least the nonvolatile table at a predetermined point among the kinds of management information stored in the management information storage area 111 of the DRAM 11. The snapshot 210 includes log block indication information which indicates position information of the logical block used for writing of the main log 220A and backup log 220B to the snapshot 210. The log block indication information includes logical address of acquired logical block to store log and information on the order of using the acquired logical block.

The main log 220A and the backup log 220B include transition information of state of the memory system 10 and difference information between the snapshot 210 (or the snapshot 210 and a log already generated) and master information after contents are changed when there is a change in contents of the master information. In this embodiment, log includes a standby log, an activate log and a normal log.

The standby log is information for memorizing that the memory system 10 enters a standby state when the memory system 10 receives a standby request from a host system. If the standby log is not in a latest log recorded in a log storage block, it is shown that an abnormal power shutdown (e.g. momentary power interruption) is occurred.

The activate log is information for memorizing that the memory system 10 transfers to the state of an activation when the memory system 10 receives a command with the possibility of accessing the NAND memory 12 in the state of the standby. The activate log guarantees that there is no access to the NAND memory 12 after the memory system 10 enters the state of the standby. The abnormal power shutdown in a state that the storage of the normal log is not completed after writing in the NAND memory 12 can be detected by recording the activate log.

The normal log is information for memorizing changed information when the master information is changed. Specifically, first normal logs in the main log 220A and the backup log 220B after the snapshot 210 is generated are difference information between the master information and the snapshot 210. A second or subsequent normal log in the main log 220A after the snapshot 210 is generated is difference information between the master information and a combination of the normal log in the main log 220A already generated and the snapshot 210. Similarly, a second or subsequent normal log in the backup log 220B after the snapshot 210 is generated is difference information between the master information and a combination of the normal log in the backup log 220B already generated and the snapshot 210.

Figure 9:
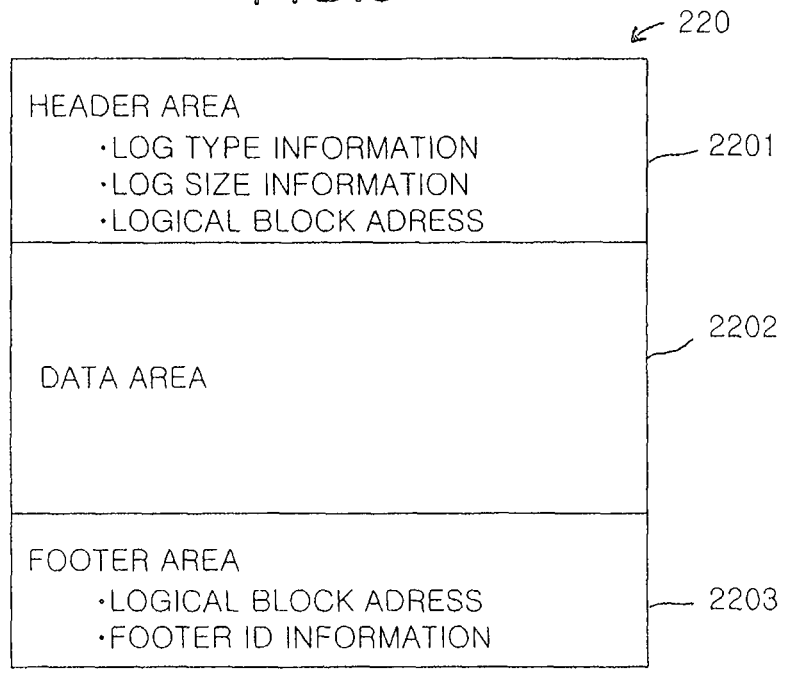
FIG. 9 depicts an example of a format of a log.

FIG. 9 depicts an example of a format of a log. The log 220 includes a header area 2201, a data area 2202 and a footer area 2203. The header area 2201 stores a log type information, a log size information and a logical block address. The log type information shows whether the log 220 is the standby log, the activate log or the normal log. The log size information shows a size of the log 220. The logical block address shows an address of the logical block in which the log 220 is written.

The footer area 2203 includes the logical block address and a footer identification information to show that it is a footer.

Figure 10:
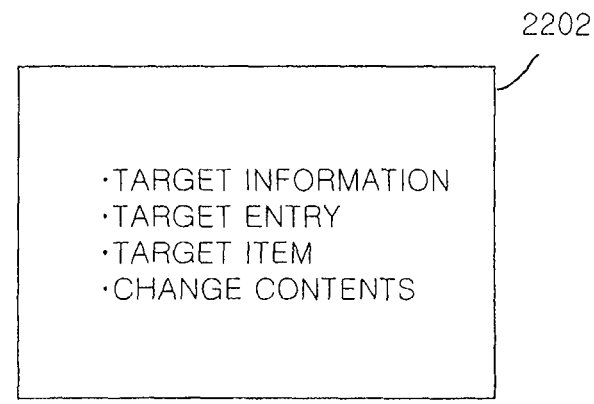
FIG. 10 depicts an example of a data area of a normal log.

The data area 2202 stores information determined in correspondence with the kind of each log. FIG. 10 illustrates an example of the data area 2202 in the normal log. In the data area of the normal log, target information to be management information of a change target, a target entry as an entry to be a change target in the target information, a target item as an item to be a change target in the target entry, and change contents as contents of a change of the target item are stored. A unit composed of the header area 2201, the data area 2202 and the footer area 2203 is called an update unit.

The main log 220A is generated after a state of the memory system 10 is transferred or the master information is actually updated. The main log 220A is generated after the master information is actually updated by executing a data writing process or other process. The backup log 220B backs up the main log 220A. The same contents as the main log 220A is bucked up in the backup log 220B after writing of the main log 220A is completed.

In this embodiment, the data size of the main log 220A is same as the data size of the backup log because the contents of the main log 220A is same as the contents of the backup log 220B. The main log 220A and the backup log 220B are stored in order from same position of different blocks, respectively. Consequently, the main log 220A and the backup log 220B are stored in the same page of the different blocks. In the following, the main log 220A and the backup log 220B shows the normal log so far as it is not mentioned.

The pointer 230 indicates the position of the snapshot 210. By the pointer 230, it becomes possible to understand the position of the snapshot 210 to return the management information to the last power off state when the memory system 10 is powered on (started up).

In FIG. 8, the snapshot 210, the main log 220A, the backup log 220B, and the pointer 230 are stored in different blocks. The snapshot 210 is stored in a block for snapshot storage. The snapshot 210 includes the logical NAND management information 42 and the intra-NAND logical-physical conversion information 43 as nonvolatile tables in the management information storage area 126 of the NAND memory 12. When a new snapshot 210 is to be stored, it is stored in a block different from that of the snapshot 210 stored before.

The main log 220A is stored in a main log storing block and the backup log 220B is stored in a backup log storing block. The main and backup log storing blocks are obtained beforehand when the snapshot 210 is stored. Therefore, the main log 220A and the backup log 220B are stored in another log storing blocks when a generation of the snapshot 210 is changed. The main log 220A and the backup log 220B which correspond to new snapshot 210 are stored from top pages of new log storing blocks obtained by the new snapshot 210. The main and backup logs 220A, 220B are stored in the main and backup log storing block with a binary mode.

The pointer 230 is stored in an instruction information storage block. The pointer 230 only has to be a pointer that indicates a top address of a block indicating storage positions of the snapshot 210. However, a portion indicating a storage position of the snapshot 210 can be a portion that indicates top addresses of respective kinds of management information included in the snapshot 210. The pointer 230 is updated when the snapshot 210 is stored anew or when a snapshot storing block or a log storing block is changed. Pointers of the main log 220A and the backup 220B can be stored in the snapshot 210 rather than in the instruction information storing block.

Figure 11:
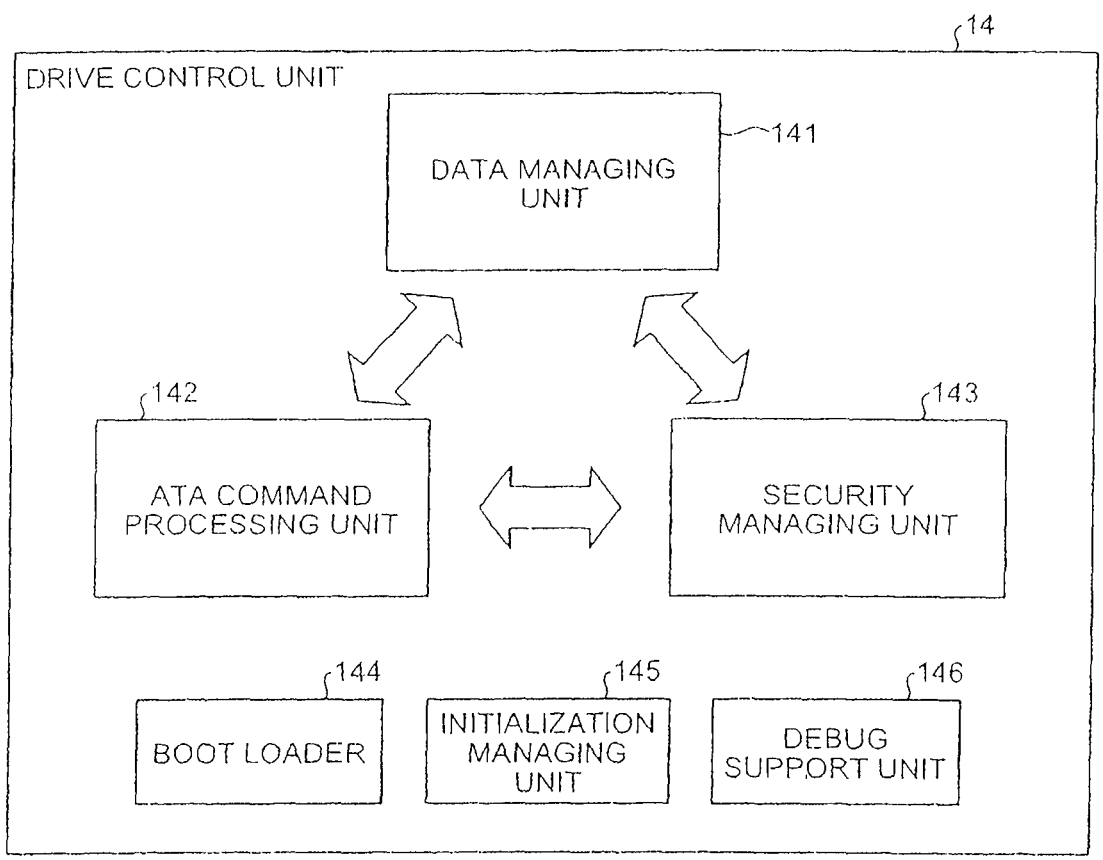
FIG. 11 is a block diagram of an example of a functional configuration of a drive control unit shown in FIG. 1.

Functions of the drive control unit 14 are explained below. FIG. 11 is a block diagram of an example of a functional configuration of the drive control circuit 14. The drive control unit 14 includes a data managing unit 141, an ATA command process unit 142, a security managing unit 143, a boot loader 144, an initialization managing unit 145, and a debug support unit 146. The data managing unit 141 performs data transfer between the DRAM 11 and the NAND memory 12 and control of various functions concerning the NAND memory 12. The ATA command process unit 142 performs data transfer process in cooperation with the data managing unit 141 based on an instruction received from the ATA interface. The security managing unit 143 manages various kinds of security information in cooperation with the data managing unit 141 and the ATA command process unit 142. The boot loader 144 loads respective management programs (FW) from the NAND memory 12 to a not shown memory (e.g., an SRAM (Static RAM)) during power on. The initialization managing unit 145 performs initialization of respective controllers and circuits in the drive control unit 14. The debug support unit 146 processes debug data supplied from the outside via the RS232C interface.

Figure 12:
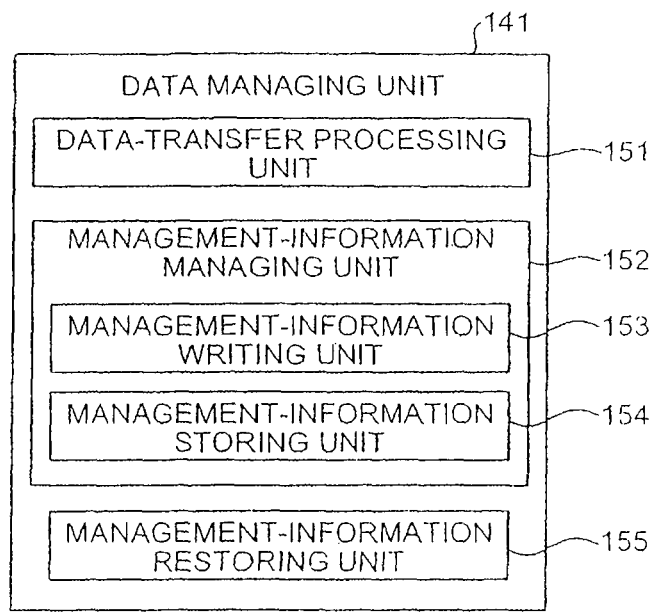
FIG. 12 is a block diagram of an example of a functional configuration of a data managing unit according to the embodiment.

FIG. 12 is a block diagram of an example of a functional configuration of a data managing unit 141. The data managing unit 141 includes a data transfer process unit 151 that performs data transfer between the DRAM 11 and the NAND memory 12, a management information managing unit 152 that performs change and storage of management information according to a change of data stored in the DRAM 11 and the NAND memory 12, and a management information restoring unit 155 that restores latest management information based on management information stored during power on or the like.

The management information managing unit 152 includes an update information management unit 153 and a management information storing unit 154. The update information management unit 153 performs a process that stores the update information relative to the master information which is stored in the master information storage region 1111 into the update region 1112 when update of the master information is necessary according to the change process for data stored in the DRAM 11 or the NAND memory 12 by the data transfer process unit 151. A pointer to the update information is buried in an update portion of the master information. The update information indicated by the pointer is referred when the host system accesses the update portion of the master information before the update information is reflected in the master information.

When the memory system 10 satisfies predetermined conditions, the management information storing unit 154 stores the master information which is stored in the master information storage region 1111 of the DRAM 11, as the snapshot 210, in the management information storage area 126 of the NAND memory 12. And the management information storing unit 154 stores storage position of the snapshot 210 as the pointer 230 in the management information storage area 126 of the NAND memory 12.

The snapshot 210 stored by the management information storing unit 154 is executed according to a predetermined condition (situation) of the memory system 10, for example, when a log storage area provided for storing the log 220 in the management information storage area 126 of the NAND memory 12 is filled (the area is filled with data).

Timing when the management information storing unit 154 stores the main log 220A and the backup log 220B is data update time on the NAND memory 12 involving update of the master information (the nonvolatile table) stored in the DRAM 11 by the management information writing unit 153 (when data writing in the NAND memory 12 is necessary). Specifically, the main log 220A and the backup log 220B are stored after process for writing data in this order.

When the power supply of the memory system 10 is turned on, the management information restoring unit 155 performs restoring process for management information based on the management information storage information stored in the management information storage area 126 of the NAND memory 12. Specifically, the management information restoring unit 155 traces the pointer 230 and the snapshot 210 in order, traces main log 220A and backup log 220B from the log block indication information in the snapshot 210, and determines whether the main 220A and the backup log 220B corresponding to the latest snapshot 210 are present. When the main log 220A and the backup log 220B are not present, the management information restoring unit 155 determines that the end of the memory system 10 is a normal end and restores, in the DRAM 11, the snapshot 210 of the snapshot storing block as management information.

When the main log 220A and the backup log 220B are present, the management information restoring unit 155 determines whether the last of the main log 220A and the backup log 220B is standby log or not and performs the restoring process to the management information with the main log 220A or the backup log 220B according to the procedure corresponding to the determination. Specifically, the management information restoring unit 155 determines that the memory system 10 was normally finished last time when the last log is standby log. The management information restoring unit 155 develops the stored main or backup logs 220A, 220B to the work area 112 of the DRAM 11, sequentially reflects the main log 220A or the backup log 220B in the snapshot 210 and restores the master information (management information) in the management information storage area 111 of the DRAM 11.

When the last log is not the standby log, the management information restoring unit 155 determines that the memory system 10 was finished by the abnormal power shutdown (momentary power interruption). The management information restoring unit 155 reflects a combination of the main log 220A and the backup log 220B in the snapshot 210 corresponding to a point where the momentary power interruption is generated and restores the master information (management information) in the management information storage area 111 of the DRAM 11.

Figure 13:
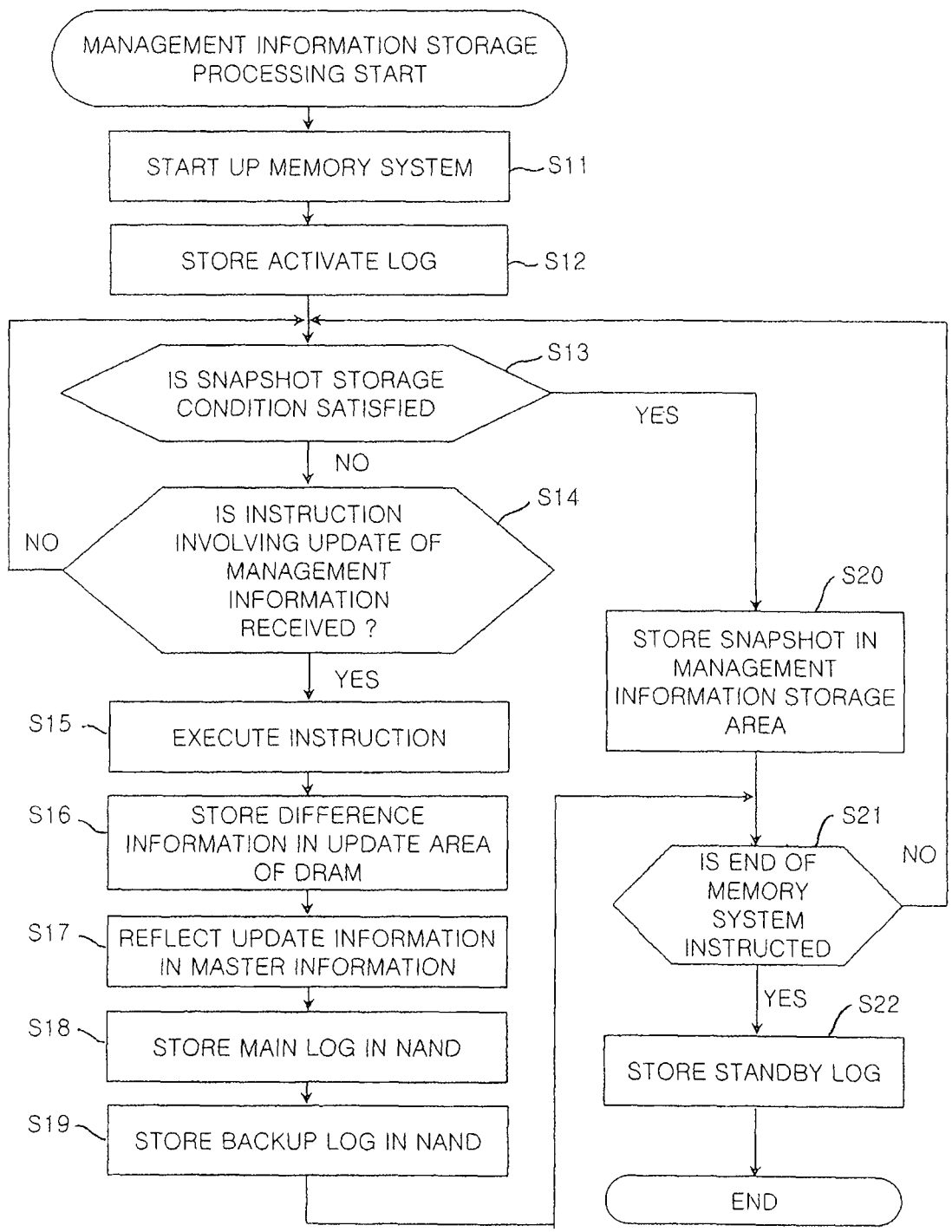
FIG. 13 is a flowchart of an example of a storage processing for management information performed by the memory system according to the embodiment.
Figure 14:
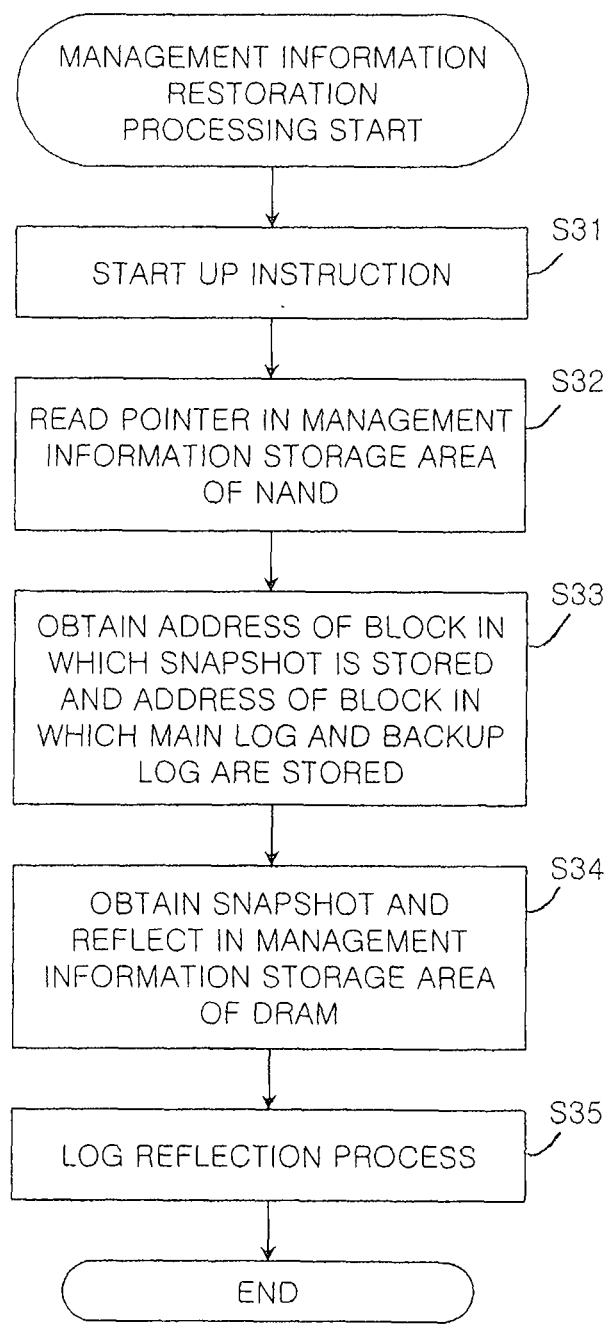
FIG. 14 is a flowchart of an example of a restoration processing for management information performed by the memory system according to the embodiment.

The storage process for management information of the memory system 10 performed by the management information managing unit 152 is explained below. FIG. 13 is a flowchart of an example of a storage process procedure for management information of the memory system 10. The memory system 10 is connected to the host system and operates as a secondary storage device of the host system.

First, when the host system and the memory system 10 are powered on and in a stared state (Step S11), the management information storing unit 154 sequentially stores the activate log in the main log storage block and the backup log storage block (Step S12).

Thereafter, writing of data in the NAND memory 12 is performed from the host system when necessary. The management information managing unit 152 determines whether a snapshot storage condition is satisfied (for example, whether the log storage area is full) (Step S13). When the snapshot storage condition is not satisfied ("No" at Step S13), the management information managing unit 152 determines whether an instruction involving update of the management information (writing of data, etc.) is received (Step S19). When the instruction involving update of the management information is not received ("No" at Step S14), the management information managing unit 152 returns to Step S13.

When the instruction involving update of the management information is received ("Yes" at Step S14), the data transfer process unit 151 executes the instruction (Step S15). As an example of such an instruction, there is writing process for user data in a predetermined block of the data storage area of the NAND memory 12. In this embodiment, it is premised that a destruction of data does not occur when the writing process by a postscript is executed. For example, it is a situation that the NAND memory 12 in which multi level data is stored is used in a single level mode or data is written in a block where the postscript was permitted.

Thereafter, the update information management unit 153 stores the difference information, which is accompanied by the update of the master information (management information) stored in the master information storage region 1111 of the DRAM 11, as the update information, in the update region 1112 of the DRAM 11 (Step S16). The management information storing unit 154 reflects the update information which is stored in the update region 1112 of the DRAM 11 in the master information of the master information storage region 1111 (Step S17). And the management information storing unit 154 stores the update information which is stored in the update region 1112, as the main log 220A, in the main log storage block obtained in the management information storage area 126 of the NAND memory 12 (Step S18). Next, the management information storing unit 154 stores the update information which is stored in the update region 1112, as the backup log 220B, in the backup log storage block obtained in the management information storage area 126 of the NAND memory 12 (Step S19). The main log 220A and the backup log 220B are difference information between the master information (nonvolatile table) at the time when the management information is updated and the snapshot 210 stored in the snapshot storage block if the main log 220A and the backup log 220B have not been stored in the main log storage block and the backup log storage block. And the main log 220A and the backup log 220B are difference information between the master information at the time when the management information is updated and a combination of the master information and the main log 220A (or the backup log 220B) already generated if the main log 220A and the backup log 220B are already stored in the main log storage block and the backup log storage block. The main log 220A and the backup log 220B are stored in the same page of each logical block.

The main log 220A (or the backup log 220B) is stored from the first logical block to the second logical block which is obtained next to the first logical block if a size of the update information stored in the update region 1112 is larger than a size of an empty region of the first logical block when the update information is written in the log storage block of the NAND memory 12 from the update region 1112. It is undesirable that a unit of the update information, which is stored in the update region 1112, is divided and stored in a different block because the logical block, in which an old log is stored, is developed in the work area 112 of the DRAM 11 and is sequentially restored from the old log when the management information is restored in the DRAM. Therefore, in the above mentioned case, a dummy block is buried in the empty region of the first logical block, contents of a third logical block which is obtained next to the second logical block is erased, and the update information may be stored in the second logical block as the main log 220A (the backup log 220B).

Next, the management information storing unit 154 determines whether the end of the memory system 10 is instructed (Step S21). When the end of the memory system 10 is not instructed ("No" at Step S21), the management information storing unit 154 returns to Step S13. When the end of the memory system 10 is instructed ("Yes" at Step S21), the management information storing unit 154 stores the standby log in the main log storage block and the backup log storage block, sequentially, and the process is finished.

When the snapshot storage condition is satisfied at Step S13 ("Yes" at Step S13), the management information storing unit 154 stores the management information including at least the nonvolatile table in the management information storage area 111 of the DRAM 11 in the management information storage area 126 of the NAND memory 12 as the snapshot 210 (Step S20). In this case, the management information storing unit 154 obtains the logical blocks which are used to storage of the main log 220A and the backup log 220B. The management information storing unit 154 stores log block instruction information which includes each position data of the logical blocks and information about the order to use of the logical blocks in the snapshot 210. Next, the management information storing unit 154 determines whether the end of the memory system 10 is instructed (Step S21). When the end of the memory system 10 is not instructed ("No" at Step S21), the management information storing unit 154 returns to Step S13. When the end of the memory system 10 is instructed ("Yes" at Step S21), the management information storing unit 154 stores the standby log in the main log storage block and the backup log storage block, sequentially, and the process is finished.

Restoring process for management information of the memory system 10 performed by the management information restoring unit 155 is explained below. FIG. 19 is a flowchart of an example of a restoration processing for management information of the memory system 10 according to the embodiment. The memory system 10 is connected to the host system and operates as the secondary storage device of the host system.

First, when the host system is powered on and a start up instruction is ordered to the memory system 10 (Step S31), the management information restoring unit 155 reads the pointer 230 stored in the management information storage area 126 of the NAND memory 12. (Step S32). The management information restoring unit 155 obtains address of the logical block in which the snapshot 210 is stored, reads the log block instruction information in the snapshot 210, and obtains address of the logical block in which the main block 220A and the backup log 220B is stored (Step S33).

The management information restoring unit 155 obtains the snapshot 210 from snapshot storage block by the obtained address of the logical block. The management information restoring unit 155 restores snapshot 210 as the master information to the master information storage region 1111 in the management information storage area 111 of the DRAM 11 (Step S39).

The management information restoring unit 155 develops the backup log 220B of the backup log storage block and the main log 220A of the main log storage block (if necessary) in the work area 112 of the DRAM 11. The management information restoring unit 155 executes a log reflection process that reflects the logs on the master information of the master information storage region 1111 in order from an oldest one (Step S35). The restoring process for the master information is finished.

A size of the work area 112 of the DRAM 11 is same as a size of the logical block and the backup log is usually stored in a plurality of logical blocks. In step S34 and step S35, a process of the developing the logical block in which old backup log 220B is stored to the work area 112 one by one until the reflection in the master information is finished and a process of the developing the update information of the next logical block to the work area 112 are repeated. The log reflection process is finished only the backup log 220B of the backup log storage block when the backup log storage block and the main log storage block is finished by the standby log. On the other hand, the log reflection process is executes by development of the main log storage block to the work area 112 when the backup log storage block and the main log storage block is not finished by the standby log.

The work reflected in the master information executes every update unit which is distinguished between the header 2201 and the footer 2203 developed in the work area 112. In this reflection process, size information and address of the logical block is read when the log is the normal log. The size defined by the size information is read from the header 2201, it is checked whether the footer 2203, having a logical block address which is same as a logical block address read from the header, is existed in the last of the size or not, and the update information which is contents of the data area 2202 is reflected in the master information. This process is executed in order from an oldest one.

Figure 15:
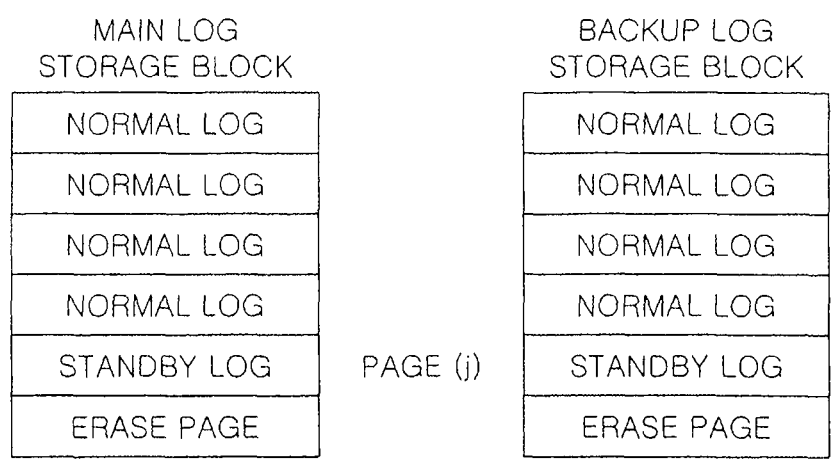
FIG. 15 depicts an example of a state of a log when the power supply is normally shutdown.

The reflection process of the log in the master information is explained in detail below. FIG. 15 is a schematic diagram of a state of the log when the power is normally shutdown. As shown in FIG. 15, when the power is normally shutdown and system is finished normally, the standby logs are existed in the last pages, in which logs are stored, of the main log storage block 220A and the backup log storage block 220B. The standby log are stored in a page (j) of the main log storage block and in a page (j) of the backup log storage block.

In this situation, the contents of the backup log storage block is developed in the work area 112 and reflected in the master information in order from an oldest update unit. When the last backup log 220B is reflected, next page is checked whether it is an erase page. When the next page of the backup log 220B is the erase page, same page of the correspondence block of the main log storage block is checked whether it is the main log 220A and the next page is checked whether it is the erase page. As explained above, the restoration of the master information is executes with the backup log 220B when the power is normally shutdown.

On the other hand, when the abnormal power shutdown (e.g. momentary power interruption) is occurred during the data writing process to the NAND memory 12, the restoring process is different by the timing when the abnormal power shutdown occurs. The restoring process when the abnormal power shutdown occurs is explained in detail below.

Figure 16:
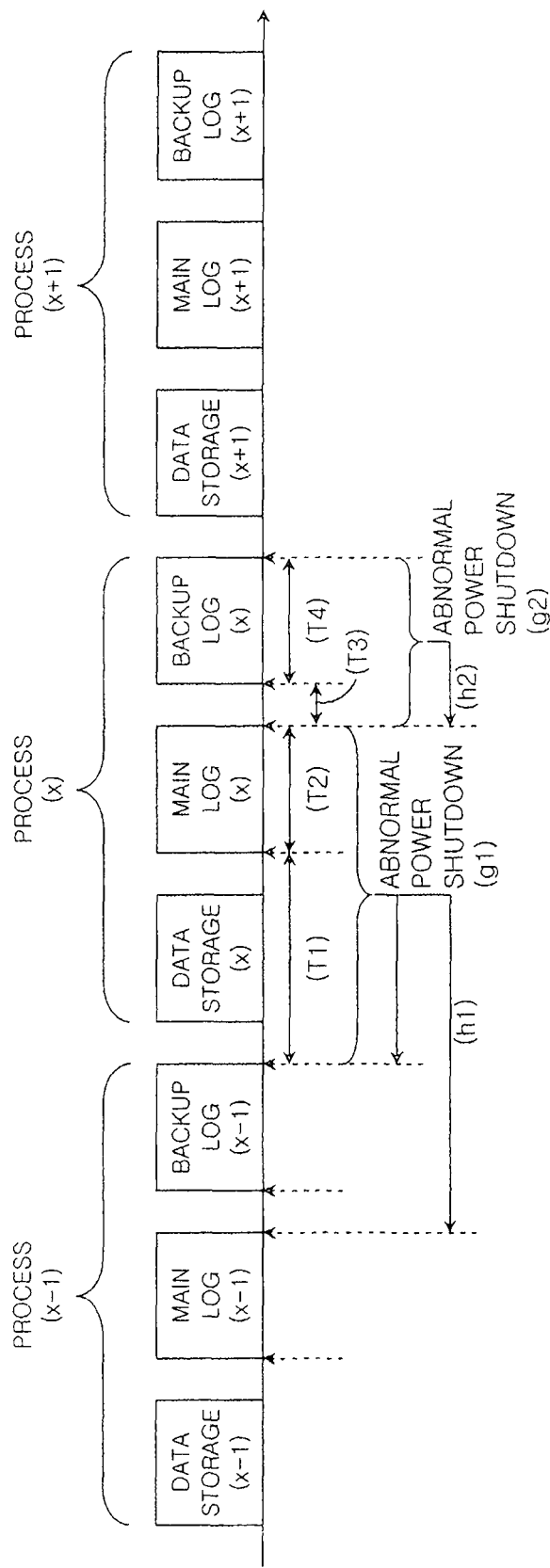
FIG. 16 a diagram for explaining a flow of the data record process and the restoring process when the abnormal power shutdown occurs.

FIG. 16 is a diagram for explaining a flow of the data record process and the restoring process when the abnormal power shutdown occurs. FIG. 17 is a schematic diagram of the state of log in each abnormal power shutdown of FIG. 16. In FIG. 16, it is shown that a (X−1)th data record of a process (X−1), a (X)th data record of a process (X) and a (X+1)th data record of a process (X+1) are sequentially executed. In the process (X−1), a storage of a main log (X−1) and a storage of a backup log (X−1) is sequentially executed after the data record (X−1) is executed. Subsequently, in the process (X), a storage of a main log (X) and a storage of the backup log (X) are sequentially executed after the data record (X) is executed. A process (X+1) is also similar.

In FIG. 16, the reflection process of the process (X) is explained. The reflection process is divided into two cases. The first is a case where the abnormal power shutdown is occurred at a period (g1) from the end of the storage process for the backup log (X−1) of the process (X−1) to the end of the storage process for the main log (X) of the process (X). The second is a case where the abnormal power shutdown is occurred at a period (g2) from the end of the storage process for the main log (X) of the process (X) to the end of the storage process for the backup log (X) of the process (X).

[First Case]

The standby log and the activate log is used for a judgment that the abnormal power shutdown is occurred at a period (T1) from the end of the storage process for the backup log (X−1) until the start of the storage process for the main log (X) of the process (X). When the abnormal power shutdown is occurred at the period (T1), the power supply is interrupted without storing the standby log and the activate log is stored in the main log 220A and the backup log 220B if the system is powered up. Therefore, it is possible to judge that the abnormal power shutdown is occurred.

A state of the page in which the log of the main log storage block is stored and a state of the page in which the log of backup log storage block is stored are used for a judgment that the abnormal power shutdown is occurred at a period (T2) which indicated from the start of the storage process for main log (X) of the process (X) to the end of the storage process for main log (X) of the process (X). In this case, there are two states indicated by FIG. 17A and FIG. 17B. In FIG. 17, a size of the log process (X) is two pages and the log is written in from a page (k) to a page (k+1) of the main log storage block and the backup log storage block.

In FIG. 17A, it is shown that the abnormal power shutdown occurs during the storage of log in the page (k+1) of the main log storage block. That is the storage of log in the page (k) of the main log storage block succeeded and the log in the page (k+1) of the main log storage block is destroyed by the abnormal power shutdown. On the other hand, it is a state that the storage of log of the process (X−1) to the page (k−1) of the backup log storage block succeeds. A destruction of the page (k) in the main log storage block is included in this case.

In FIG. 17B, it is shown that the abnormal power shutdown occurs after the end of the storage to the page (k) in the main log storage block and before the start of the storage to the page (k+1) in the main log storage block. The storage of log in the page (k) of the main block succeeds and any log is not stored in the page (k+1) of the main log storage block. And it is a state that the storage of log of the process (X−1) to the page (k−1) of the backup log storage block succeeds.

When the log is stored in such a state, the management information restoring unit 155 develops the backup log 220B stored in the backup log storage block to the work area 112 of the DRAM 11. The management information restoring unit 155 reflects the log in the master information of the master information storage region 1111 of the DRAM 11 in order from an oldest update unit. At this time, the management information restoring unit 155 reflects in the master information to the log of process (x−1) stored in the page (k−2) and the page (k−1). The management information restoring unit 155 reads the page (k) of the backup log storage block, detects that the page (k) is an erase page and understands that the backup log storage block is the end in the page (k−1). Next, the management information restoring unit 155 reads the page (k) and the page (k+1) of the main log storage block. The management information restoring unit 155 detects that the main log (x) corresponding to the process (x) in the main log storage block is not stored at a size defined by the size information of the header of the page (k) in the main log storage block. Specifically, in FIG. 17A, the management information restoring unit 155 detects that a read error is occurred at the page (k) of the main log storage block. And in FIG. 17B, the management information restoring unit 155 detects that the page (k+1) where the data should exist is the erase page.

In above mentioned case, the management information restoring unit 155 judges that the data record (X) is not finished normally. The management information restoring unit 155 considers that the data record (x−1) has been finished normally and restores the master information with the backup log (x−1) to the page (k−1) in the backup log storage block (h1).

[Second Case]

When the abnormal power shutdown is occurred at a period (T3) from the end of the storage of the main log (x) of the process (x) until the start of the storage of the backup log (x), an occurrence of the abnormal power shutdown is detected with a state of a page in which logs of the main log storage block and the backup log storage block.

In FIG. 17C, the main log (x) is successfully stored in the page (k) to the page (k+1) of the main log storage block and it is stored only to a backup log of the process (x−1) in backup log storage block.

In this case, the management information restoring unit 155 develops the backup log 220B in the backup log storage block in the work area 112 of the DRAM 11. And the management information restoring unit 155 reflects the log in the master information of the master information storage region 1111 of the DRAM 11 in order from an oldest update unit. At this time, the management information restoring unit 155 reflects in the master information to the log (x−1) of the process (x−1) stored in the page (k−2) and the page (k−1). The management information restoring unit 155 reads the page (k) of the backup log storage block, detects that the page (k) is an erase page and understands that the backup log storage block is the end in the page (k−1). Next, the management information restoring unit 155 reads the page (k) of the backup log storage block, detects that the page (k) is an erase page and understands that the backup log storage block is the end in the page (k−1). Next, the management information restoring unit 155 reads the page (k) of the main log storage block. The management information restoring unit 155 detects that the main log (x) corresponding to the process (x) in the main log storage block is stored at a size defined by the size information of the header of the page (k) in the main log storage block. That is the management information restoring unit 155 detects that main log (x) corresponding to the data storage (x) is stored in the page (k) and the page (k+1), and the logical block address which is same as the logical block address stored in the header is existed in the footer of the main log (x). And the management information restoring unit 155 detects that the page (k+2) is an erase page.

In above mentioned case, the management information restoring unit 155 judges that the data record (X) is finished normally. The management information restoring unit 155 considers that the data record (x) has been finished normally and restores the master information with the backup log (x−1) to the page (k−1) in the backup log storage block and the main log (x) from the page (k) to the page (k+1) of the main log storage block (h2).

When the abnormal power shutdown is occurred at a period (T4) from the start to the end of the storage of the backup log (x) of the process (x), an occurrence of the abnormal power shutdown is detected with a state of a page in which logs of the main log storage block and the backup log storage block. In this case, there are two cases as shown in FIG. 17D and FIG. 17E.

In FIG. 17D, the main log (x) corresponding to the data record (x) is successfully stored in the page (k) and the page (k+1) of the main log storage block. On the other hand, in the backup log storage block, the log stored in the page (k) is destroyed because the abnormal power shutdown is occurred during the storage of log in the page (k) of the backup log storage block. A destruction of the page (k+1) in the backup log storage block is included in this case.

In FIG. 17E, the main log (x) corresponding to the data record (x) is successfully stored in the page (k) and the page (k+1) of the main log storage block. In addition, the record of the backup log to the page (k) is finished and the abnormal power shutdown is occurred before the start of the record to the page (k+1).

In this case, the management information restoring unit 155 develops the backup log 220B in the backup log storage block in the work area 112 of the DRAM 11. And the management information restoring unit 155 reflects the log in the master information of the master information storage region 1111 of the DRAM 11 in order from an oldest update unit. At this time, the management information restoring unit 155 reflects in the master information to the backup log (x−1) of the process (x−1) stored in the page (k−2) and the page (k−1). The management information restoring unit 155 reads the page (k) of the backup log storage block. The management information restoring unit 155 detects that the backup log (x) corresponding to the process (x) in the backup log storage block is not stored at a size defined by the size information of the header of the page (k) in the backup log storage block.

Specifically, in FIG. 17D, the management information restoring unit 155 detects that a read error is occurred at the page (k) of the backup log storage block. And in FIG. 17E, the management information restoring unit 155 detects that the page (k+1) where the data should exist is the erase page. In addition, the management information restoring unit 155 checks whether the next page is an erase page and understands that the backup log storage block is the end in the page (k).

Next, the management information restoring unit 155 read the page (k) of the main log storage block. The management information restoring unit 155 detects that the main log (x) corresponding to the process (x) in the main log storage block is stored at a size defined by the size information of the header of the page (k) in the main log storage block. That is the management information restoring unit 155 detects that main log (x) corresponding to the data storage (x) is stored in the page (k) and the page (k+1), and the logical block address which is same as the logical block address stored in the header is existed in the footer of the main log (x). And the management information restoring unit 155 detects that the page (k+2) is an erase page.

In above mentioned case, the management information restoring unit 155 judges that the data record (X) is finished normally. The management information restoring unit 155 considers that the data record (x) has been finished normally and restores the master information with the backup log (x−1) to the page (k−1) in the backup log storage block and the main log (x) from the page (k) to the page (k+1) of the main log storage block (h2).

As described above, the reflection process of the master information is executed with the backup log 220B and the main log 220A if necessary.

In addition, the log in the main log storage block may be developed in the work area 112 of the DRAM 12 instead of the log in the backup log storage block developed in the work area 112 of the DRAM 12.

According to the embodiment, even the abnormal power shutdown occurs in the memory system 10, the main log 220A and the backup log 220B are stored in the same page of different blocks. Therefore, it is possible to easily determine, based on the last page of the main log 220A and the last page of the backup log 220B, which timing is timing when the abnormal power shutdown occurs. It is also possible to easily determine which log of the main log and the backup log can be used to restore the management information (a restoration point). Therefore, the memory system, 10 can be easily and quickly reset to a state before abnormal power shutdown occurs.

Because the main log and the backup log are stored from the top pages of the different blocks, it is easily to refer between the main log 220A and the backup log 220B.

Because the main log 220A and the backup log 220B are stored with a single level mode, it is fast to read and write the data. And because a postscript process does not occur, a pre-written data may not be destroyed by a destruction of the lower page when the momentary power interruption occurs and it is not necessary to take measures.

Other memory such as a NOR memory or an AND memory may be used instead of the NAND memory.

It is possible to apply a floating gate type and a charge trap type such as a MONOS type as a charge storage structure of the nonvolatile memory cell.

What is claimed is:

1. A method of controlling a memory system comprising:
   storing a snapshot in a nonvolatile memory;
   storing a main log in a first block of the nonvolatile memory;
   storing a backup log in a second block of the nonvolatile memory;
   storing management information including a storage position of data stored in the nonvolatile memory in a volatile memory;
   performing data management in the nonvolatile memory based on the management information;
   receiving data from a host apparatus, writing data in the nonvolatile memory, and updating the management information;
   writing the main log in the first block in the nonvolatile memory after writing data in the nonvolatile memory, the main log being an update information of the management information;
   writing the backup log in the second block in the nonvolatile memory after writing the main log in the nonvolatile memory, the backup log having contents same as that of the main log; and
   saving the management information as the snapshot in the nonvolatile memory when a predetermined condition is satisfied; wherein
   the nonvolatile memory includes a plurality of blocks, each one of the plurality of blocks is a data erasing unit, and the main log and the backup log are written in different blocks respectively, and
   each one of the plurality of blocks includes a plurality of pages, each one of the plurality of pages is a data programming unit or a data reading unit, and the main log and the backup log are written in different pages having a same page number respectively.

2. The method according to claim 1, further comprising:
   when a number of the backup log is less than that of the main log, restoring the management information with the snapshot and the main log.

3. The method according to claim 1, further comprising:
   when a number of the backup log is more than that of the main log, restoring the management information with the snapshot and the backup log.

4. The method according to claim 1, wherein the main log and the backup log include a standby log respectively, and the standby log indicates that the memory system enters a standby state when the memory system receives a standby request from the host system.

5. The method according to claim 4, further comprising:
   determining that an abnormal power shutdown has occurred based on whether the standby log is included in the main log and the backup log.

6. The method according to claim 1, further comprising:
   determining that an abnormal power shutdown has occurred based on whether the main log and the backup log are normally stored.

7. The method according to claim 1, wherein the nonvolatile memory includes a plurality of memory cells, each one of the plurality of memory cells is configured to store multiple bits, and the main log and the backup log are written by a single bit mode.

8. The method according to claim 1, wherein the management information is saved as the snapshot when at least one of the main log and the backup log are overflowed from the respective blocks.

9. A memory system comprising:
   a nonvolatile memory configured to store a snapshot, including a first block configured to store a main log, and including a second block configured to store a backup log;

a volatile memory configured to store management information including a storage position of data stored in the nonvolatile memory; and a controller configured to perform data management in the nonvolatile memory based on the management information, wherein the controller is configured to:
  receive data from a host apparatus, write data in the nonvolatile memory, and update the management information;
  write the main log in the first block in the nonvolatile memory after writing data in the nonvolatile memory, the main log is an update information of the management information;
  write the backup log in the second block in the nonvolatile memory after writing the main log in the nonvolatile memory, the backup log has contents same as that of the main log; and
  save the management information as the snapshot in the nonvolatile memory when a predetermined condition is satisfied; wherein
the nonvolatile memory includes a plurality of blocks, each one of the plurality of blocks is a data erasing unit, and the main log and the backup log are written in different blocks respectively, and
each one of the plurality of blocks includes a plurality of pages, each one of the plurality of pages is a data programming unit or a data reading unit, and the main log and the backup log are written in different pages having a same page number respectively.

10. The memory system according to claim 9, wherein when a number of the backup log is less than that of the main log, the controller is configured to restore the management information with the snapshot and the main log.

11. The memory system according to claim 9, wherein when a number of the backup log is more than that of the main log, the controller is configured to restore the management information with the snapshot and the backup log.

12. The memory system according to claim 9, wherein the main log and the backup log include a standby log respectively, and the standby log indicates that the memory system enters a standby state when the memory system receives a standby request from the host system.

13. The memory system according to claim 12, wherein the controller is configured to determine that an abnormal power shutdown has occurred based on whether the standby log is included in the main log and the backup log.

14. The memory system according to claim 9, wherein the controller is configured to determine that an abnormal power shutdown has occurred based on whether the main log and the backup log are normally stored.

15. The memory system according to claim 9, wherein the nonvolatile memory includes a plurality of memory cells, each one of the plurality of memory cells is configured to store multiple bits, and the main log and the backup log are written by a single bit mode.

16. The memory system according to claim 9, wherein the management information is saved as the snapshot when at least one of the main log and the backup log are overflowed from the respective blocks.

* * * * *